Oct. 30, 1945. G. E. PHILLIPS 2,388,076
PROCESS FOR STABILIZING PETROLEUM OILS
Filed Sept. 14, 1943
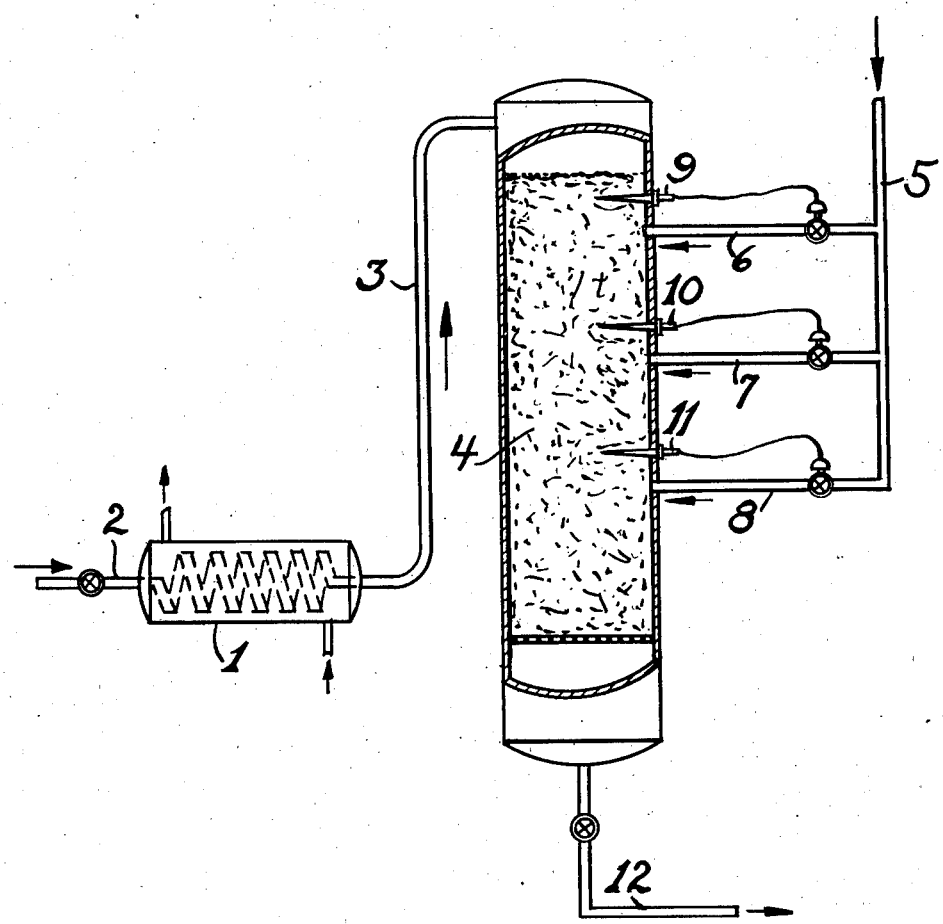
Gerald E. Phillips Inventor
By P. H. Young Attorney Patented Oct. 30, 1945

2,388,076

UNITED STATES PATENT OFFICE 2,388,076

PROCESS FOR STABILIZING A PETROLEUM OIL

Gerald E. Phillips, Cranford, N. J., assignor to Standard Oil Development Company, a corporation of Delaware Application September 14, 1943, Serial No. 502,235

4 Claims. (Cl. 196—147)

The present invention relates to a process of treating mineral oils, and is more particularly concerned with the stabilization and improvement of petroleum oils of the motor fuel range by contacting the same with an activated clay catalyst.

This is a continuation-in-part of application Serial Number 370,461, filed December 17, 1940, and which has issued as Patent 2,331,343, October 12, 1943.

It is known in the art to subject various petroleum oil feed stocks, such as heavy naphthas, gas oils, reduced crudes and the like, to temperature and pressure conditions adapted to produce relatively lower boiling constituents and relatively higher boiling constituents. It is also known in the art to refine the resulting products by treating the same with various clays, metallic oxides and the like for the purpose of stabilizing the same and particularly for the purpose of removing objectionable unsaturated material by polymerization. For example, a cracked motor fuel product may be improved by contacting the same with an activated clay catalyst at elevated temperatures, whereby the diolefins present may be removed by polymerization. Gasolines may be treated by such a method in order to improve color and reduce the tendency to form gum.

A difficulty which arises in connection with the treatment of materials containing unsaturated compounds with an activated clay catalyst at elevated temperatures is the fact that after the reaction has been initiated the large quantity of exothermic heat evolved causes the temperature of the catalyst bed to rise to an undesirable degree. In order to control the temperature within the desired operating range, various proposals have been made. It has been proposed that the feed stock be introduced into the clay treating zone somewhat below the preferred temperature. When operating in this manner, a portion of the exothermic heat is taken up by the feed stock and degradation of the feed stock is prevented. It has also been proposed to utilize various cooling means, such as cooling coils and the like, throughout the reaction zone. This, however, has not been entirely satisfactory owing to the fact that in order adequately and positively to control the temperature of the reaction, the reaction zone must have a relatively small diameter.

I have now discovered a process by which it is possible to positively control the temperature of the reaction throughout the reaction zone but within the desired critical temperature range. In accordance with my process the temperature within the treating zone is maintained substantially constant by partially deactivating the clay catalyst after the reaction has been well initiated, by introducing at a plurality of points within the catalyst bed small amounts of water, either as liquid water or steam. It will be understood that the catalytic activity of the clay is dependent on the removal of most of the combined water by burning at quite high temperatures. It has been found that the maximum activity of a typical Attapulgus clay can be reached by heating the clay at a temperature of 950–1000° F., but when heating at somewhat lower temperatures, e. g., 500° F., the clay shows no appreciable activity. The control of the water content of the clay is therefore an extremely important feature in the control of the activity of the clay as a catalyst. It has therefore been found possible to partially deactivate the clay catalyst during the treating process in order that reaction may become much less violent and the temperature controlled within the desired range.

By introducing only relatively small amounts of water into the catalyst bed the temperature control by partial deactivation of the catalyst is brought about. The amount of water necessary is far less than that which would be required for simple cooling by contact. It has been found, for example, that in order to reduce the temperature of a reaction of the type desired from 535° F. to 450° F., in a case where incoming feed stock is at a temperature of 375° F., about 4% of water, based on the feed stock, would be required if the water effected the desired reduction in temperature by simple contact, and that if it was desired to reduce the temperature to 375° F. the amount of water required would be from 8% to 10%, depending on the temperature of the water. However, by acting as an agent for deactivating clay the amount actually required to reduce the temperature through a drop of 200° F. or less would be about 0.1%, based on the feed stock, and about 0.5% if the water is in the form of steam.

The process of my invention may be readily understood by reference to the attached drawing illustrating a preferred emebodiment of the same. For purposes of illustration, it is assumed that the feed oil comprises a cracked petroleum distillate boiling in the motor fuel boiling range, such as a severely cracked gasoline of 400° F. end point containing substantial quantities of conjugated diolefins. The feed oil is introduced into the heating coil 1 by means of feed line 2 and is raised to the desired temperature, e. g., a temperature of about 375° F. The feed oil is withdrawn by means of line 3, introduced into the clay treating zone 4 and passed downwardly through the same and withdrawn by means of line 12. The reaction being exothermic, the temperature tends to rise. In accordance with my process, small quantities of water, for example, in the form of wet steam, are introduced at a plurality of points by means of line 5, which branches into lines 6, 7, and 8, respectively, leading directly into the reaction zone. By means of thermocouples 9, 10, and 11 the amount of water or steam introduced into the catalyst bed may be automatically controlled in conformity with variations in the temperature of the bed. The treated oil withdrawn from reaction zone 4 by means of line 12 may be further handled or refined in any manner desired. It is to be understood that clay treating zone 4 may comprise any suitable number and arrangements of contacting units. In a process such as that herein described the pressure employed may be any pressure required to maintain the treated oil substantially in liquid phase, and in the specific example described a suitable pressure is about 100 lbs./sq. in. gauge. It may not be necessary in many cases to continue adding water during the entire process of operation, since the clay may become sufficiently deactivated after a certain period of time to maintain the temperature within the desired limits for the remainder of the operation.

The process of the present invention may be adapted to the treatment of any mineral oil with activated clay in which the reaction is exothermic and in which it is desired to control the temperature within a narrow critical temperature range. As stated above, the invention is particularly applicable in the treatment of motor fuel fractions containing unsaturated material, such as that produced by severe thermal or catalytic cracking of light and heavy naphthas and gas oils under low pressure (0 to 200 pounds/sq. in. gauge) and high temperature (950 to 1400° F.) conditions either with or without the presence of steam. Such stocks usually have A. S. T. M. acid heats in the range of 100 to 500° F. and diene numbers of 5 to 40.

In operations of the type described in which polymerization of the unsaturated portions of the feed stock takes place, it is desirable that the temperature in the reaction zone be controlled in the range from about 300° to about 450° F. The operation, in general, is conducted under substantially non-cracking conditions.

The cooling fluid added at a plurality of stages comprises water in the liquid or vaporous state, and wet steam, such as a typical refinery exhaust steam at about 15 lbs. pressure and at a temperature of about 267° F., is particularly suited for the purpose. In general, it has been found preferable to introduce the water at at least three stages and to introduce not more than about 0.2% of liquid water or 1.0% of steam by weight, based upon the feed oil. Particularly desirable results are secured by utilizing a plurality of thermostats or equivalent means in the path of the flowing fluid immediately preceding the respective points of introduction into the reaction zone, in a manner adapted to regulate and control the inward flow of the deactivating fluid.

The clay used as a catalyst in the processes described may be any adsorptive clay suitable for preparing active catalysts, such as Attapulgus clay, floridin, fuller's earth and the like. In general, it is preferred that the clay be activated by burning the same at a temperature in the range from about 950° to about 1000° F. A desirable particle size is from 30 to 60 mesh.

In general, the most desirable feed rate for the incoming oil stock should be from 0.1 to 10 volumes per volume of clay in the catalyst bed per hour, and preferably from about 0.25 to about 1.0 volume per volume of clay per hour.

The present invention is not to be considered as limited by any of the examples or embodiments thereof, which are described herein for illustrative purposes only, but is limited solely by the terms of the appended claims.

I claim:

1. A process for stabilizing a petroleum oil fraction of essentially the motor fuel range and containing a substantial quantity of unsaturated compounds, which comprises contacting the same in liquid phase with a bed of an activated clay catalyst at a temperature at least as high as 300° F. and controlling the temperature within the reaction zone by introducing water into the catalyst bed at a plurality of points and only in an amount which is not more than about 1%, based on the feed stock.

2. A process as defined in claim 1 in which the temperature of the feed stock introduced into the reaction zone is not higher than 400° F.

3. A process for stabilizing a petroleum oil fraction of the motor fuel range containing substantial quantities of diolefins, which comprises contacting the same in liqiud phase with a bed of an activated clay catalyst at a temperature of about 300° to about 450° F. and controlling the temperature within the reaction zone by introducing not more than about 1% of steam, based on the feed stock.

4. A process as defined in claim 3 in which the steam is introduced at at least three points within the catalyst bed and in which the amount of steam introduced at each point is thermostatically controlled so that the temperature within the catalyst bed is maintained at from about 300° to about 450° F.

GERALD E. PHILLIPS.